(12) United States Patent
Dewnani et al.

(10) Patent No.: US 8,571,604 B2
(45) Date of Patent: Oct. 29, 2013

(54) SUBSCRIBER IDENTITY MODULE (SIM) CARD ACCESS SYSTEM AND METHOD

(75) Inventors: Jay Dewnani, Houston, TX (US); Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1480 days.

(21) Appl. No.: 12/009,549

(22) Filed: Jan. 18, 2008

(65) Prior Publication Data

US 2009/0186657 A1 Jul. 23, 2009

(51) Int. Cl.
*H04M 1/00* (2006.01)

(52) U.S. Cl.
USPC .......................................................... 455/558

(58) Field of Classification Search
USPC ................ 455/458, 457, 558, 432.1; 370/389
See application file for complete search history.

(56) References Cited

U.S. PATENT DOCUMENTS

| | | | |
|---|---|---|---|
| 6,092,133 A | 7/2000 | Erola et al. | |
| 6,768,896 B2 | 7/2004 | Tjalldin et al. | |
| 6,870,733 B2 | 3/2005 | Castell et al. | |
| 6,912,593 B2 | 6/2005 | Deng | |
| 6,999,722 B2 | 2/2006 | Iwasaki | |
| 7,168,092 B2 | 1/2007 | King et al. | |
| 7,269,732 B2 | 9/2007 | Killian-Kehr | |
| 7,715,189 B2 * | 5/2010 | Iida et al. | 361/679.55 |
| 2002/0154632 A1 * | 10/2002 | Wang et al. | 370/389 |
| 2004/0162105 A1 | 8/2004 | Reddy et al. | |
| 2005/0010683 A1 * | 1/2005 | Moleyar et al. | 709/238 |
| 2005/0288056 A1 | 12/2005 | Bajikar et al. | |
| 2006/0098620 A1 | 5/2006 | Zhou et al. | |
| 2006/0116163 A1 * | 6/2006 | Golightly | 455/557 |
| 2006/0127220 A1 * | 6/2006 | Lee | 416/97 R |
| 2006/0293028 A1 | 12/2006 | Gadamsetty et al. | |
| 2007/0030857 A1 | 2/2007 | Fulknier et al. | |
| 2007/0127220 A1 * | 6/2007 | Lippert et al. | 361/737 |
| 2007/0154014 A1 | 7/2007 | Aissi et al. | |
| 2007/0173123 A1 | 7/2007 | Thornton et al. | |
| 2007/0202749 A1 | 8/2007 | Bhat et al. | |
| 2008/0020755 A1 * | 1/2008 | Liu et al. | 455/432.1 |
| 2008/0214240 A1 * | 9/2008 | Choi et al. | 455/558 |
| 2009/0156253 A1 * | 6/2009 | Shi et al. | 455/558 |
| 2009/0307506 A1 * | 12/2009 | He et al. | 713/300 |

OTHER PUBLICATIONS

International Search Report & Written Opinion dated Feb. 24, 2010, pp. 12.

* cited by examiner

*Primary Examiner* — Temica M Beamer
*Assistant Examiner* — Joel Ajayi

(57) ABSTRACT

An electronic device comprises a controller coupled to a switch and configured to control actuation of the switch to enable at least two different modules of the electronic device to access content stored on a subscriber identity module (SIM) card based on a communications module operating configuration for the electronic device.

20 Claims, 3 Drawing Sheets

SUBSCRIBER IDENTITY MODULE (SIM) CARD ACCESS SYSTEM AND METHOD

BACKGROUND

Subscriber identity module (SIM) cards are typically used in connection with a wireless wide are network (WWAN) system. Generally, SIM cards comprise a small storage element configured to store user authentication information as well as contact information. Electronic devices are generally configured to access and/or read the information stored on a SIM card only if the electronic device is also configured with a corresponding WWAN module, thereby limiting a user's ability to access the information stored on the SIM card using an electronic device configured with a communications system other than WWAN.

DETAILED DESCRIPTION OF THE DRAWINGS

Figure 1:
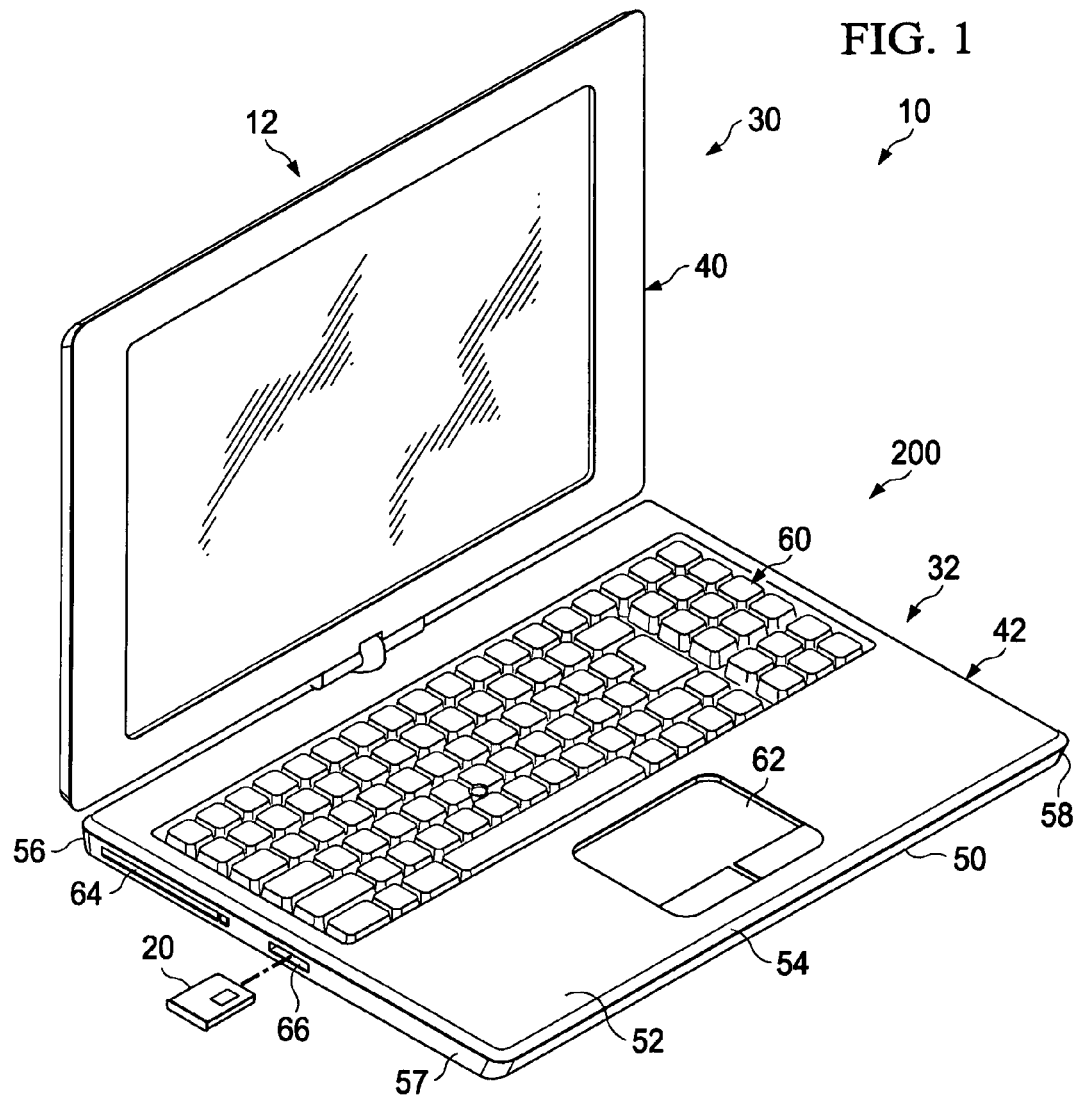
FIG. 1 illustrates an electronic device in which an embodiment of a subscriber identity module (SIM) card processing system is employed to advantage.

FIG. 1 illustrates an electronic device 10 in which an embodiment of a subscriber identity module (SIM) card access system 200 is employed to advantage. System 200 is configured to enable various components and/or devices within and/or forming part of electronic device 10 to access contents stored on a SIM card 20 installed on and/or otherwise loaded onto electronic device 10. In FIG. 1, electronic device 10 comprises a laptop or notebook computer 12. It should be understood, however, that electronic device 10 can be any type of device such as, but not limited to, a desktop computer, a tablet computer, a personal digital assistant (PDA), a telephone, or any other type of portable or non-portable electronic device.

In the illustrated embodiment, electronic device 10 comprises a display member 30 rotably coupled to a base member 32. Display member 30 and base member 32 each comprise housings 40 and 42, respectively, for housing and/or supporting one or more components of electronic device 10. For example, in the illustrated embodiment, housing 42 of base member 32 comprises a bottom wall 50, a working surface 52, a front wall 54, a back wall 56, and side walls 57 and 58. In FIG. 1, working surface 52 comprises a keyboard 60 and a touchpad 62. However, it should be understood that working surface 52 may also comprise more or fewer components and/or devices than illustrated. In FIG. 1, base member 32 also comprises interfaces for various user interface components disposed along any of working surface 52 and walls 50, 54, 56, 57 and 58. For example, in FIG. 1, base member 32 comprises an optical drive 64 and a SIM card slot 66 disposed along side wall 57. It should be understood, however, that optical drive 64 and SIM card slot 66 may be disposed along any of walls 50, 52, 54, 56 and 58 of base member 32 and/or may be located elsewhere on electronic device 10 (e.g., in display member 30).

In the illustrated embodiment, SIM card 20 is insertable into externally accessible SIM card slot 66 disposed along side wall 57. As used herein, "externally" accessible is defined as having an opening and/or aperture that is exposed to an exterior of electronic device 10. SIM card slot 66 is configured to accept SIM card 20; however, it should be understood that SIM card slot 66 may also be configured to accept any other type of electronic memory component (e.g., a secured digital (SD) card, a memory stick, a multimedia card, etc.). In FIG. 1, SIM card 20 is a smart card or a memory component which securely stores user identification information and other user-specific information (e.g., a service-subscriber key, a contacts list, credit card information, etc.). In general, SIM card 20 may be used to easily and securely transfer user identification information between a plurality of communications devices and/or systems (e.g., electronic device 10 and a wireless communications service provider). In system 200, SIM card 20 enables a user to easily and securely transfer information stored on SIM card 20 between one electronic device 10 and another compatible electronic device 10 (e.g., by physically transferring SIM card 20 between one electronic device 10 (a notebook computer) and another compatible electronic device 10 (a telephone), the content contained on SIM card 20 may also be transferred and/or accessed by both devices).

Figure 2:
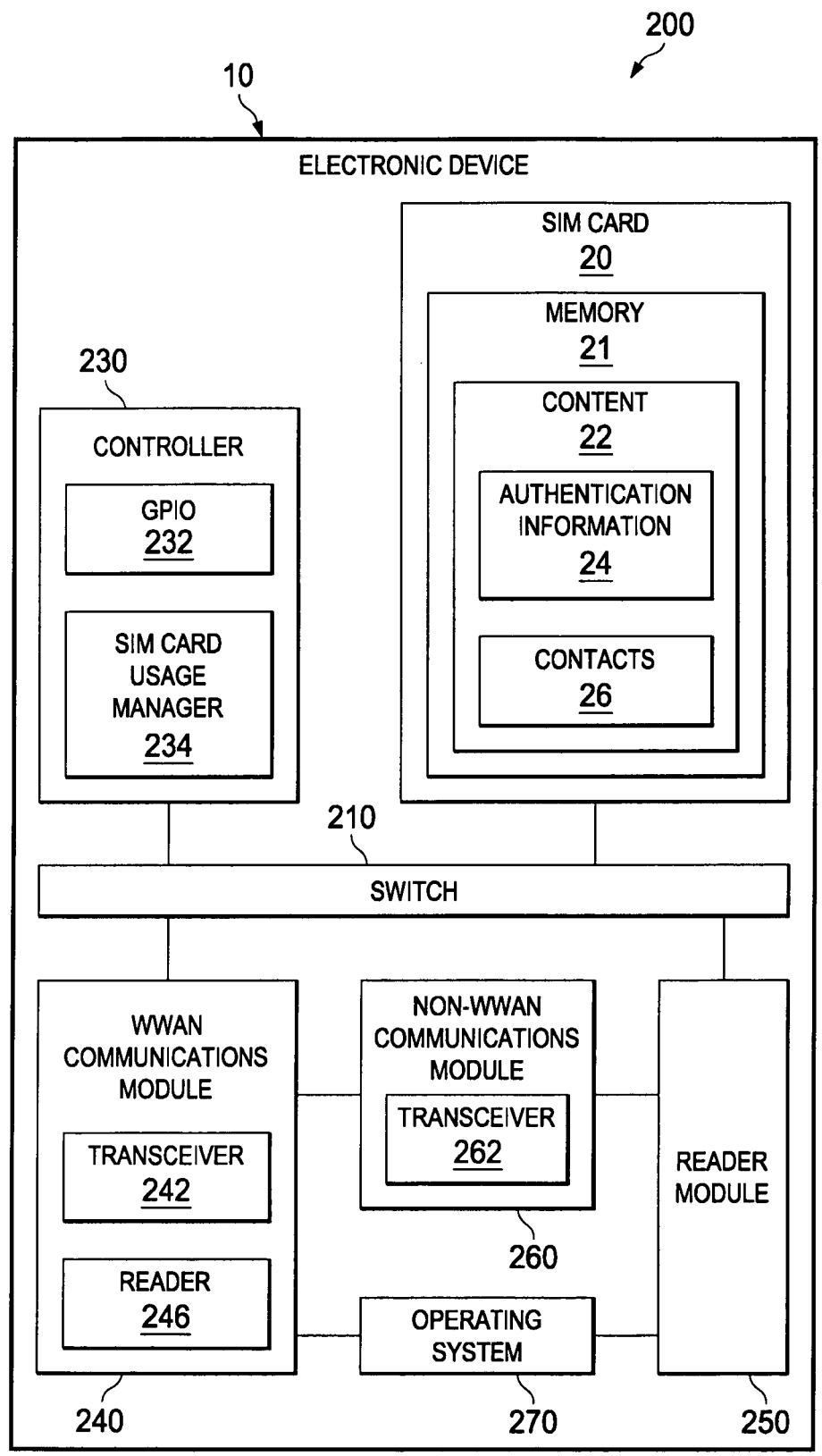
FIG. 2 is a block diagram illustrating an embodiment of a SIM card processing system for an electronic device.

FIG. 2 is a block diagram illustrating an embodiment of system 200 for electronic device 10. In FIG. 2, one or more components of system 200 may comprise hardware, software, firmware, or a combination thereof. In the illustrated embodiment, system 200 comprises SIM card 20, a switch 210, a controller 230, a wireless wide area network (WWAN) communications module 240, a reader module 250, a non-WWAN communications module 260, and an operating system 270. In the illustrated embodiment, SIM card 20 is inserted and/or disposed within electronic device 10 (e.g., within slot 66 (FIG. 1)). SIM card 20 comprises a memory 21 for storing data and/or information for use by electronic device 10. In some embodiments, memory 21 comprises content 22 which includes authentication information 24 and contacts 26 stored as databases and/or other data storage mechanisms (tables, worksheets, files, etc.). In some embodiments, authentication information 24 is the information and/or data used to identify a specific user of electronic device 10. For example, authentication information 24 may comprise the name of the user, an identification code for the user, an Internet protocol (IP) address for the user, subscriber information, credit card information, etc. In some embodiments, contacts 26 is a phone book or address book of contacts for a particular user. Contacts 26 may be configured in any form (such as table, worksheet, file, etc.) and may comprise any type of contact information (e.g., name, address, phone number, children's name, birth date, etc.). It should be understood that other types of content 22 may also be stored on SIM card 20.

In FIG. 2, SIM card 20 is coupled to a switch 210. Switch 210 may be any device configured to enable a change in the flow and/or course of a power current. In the illustrated embodiment, controller 240 is a processing unit and/or a chipset controller which manages and/or drives the position of switch 210 based on the communications module operating configuration of electronic device 10. Controller 240 comprises a general purpose input/output (GPIO) 242 and a SIM card usage manager 234. In some embodiments, GPIO 242 is configured to drive the actuation of switch 210; however, it should be understood that any type of input/output controller system may be used in controller 240 to drive switch 210. In some embodiments, SIM card usage manager 234 is a set of executable instructions configured to enable particular components within electronic device 10 access to content 22 of SIM card 20 based on the communications module configuration of electronic device 10. Specifically, SIM card usage manager 234 determines which type of communications module that electronic device 10 is using and, based on the type of communications module being used, transmits a command to GPIO 242 to actuate switch 210 to enable and/or activate that particular communications module to access content 22 of SIM card 20.

In some embodiments, WWAN communications module 240 is a communications system configured to enable communications between electronic device 10 and another compatible electronic device using a cellular network based communications protocol (e.g., Global System for Mobile communications (GSM) protocol, a High Speed Downlink Pack Access (HSDPA) protocol, a Code Division Multiple Access (CDMA) protocol, etc.). A "cellular network" as defined herein is a radio network comprising a number of cellular sites or base stations configured to receive and/or transmit communications signals for a particular network carrier operating on a cellular frequency. In FIG. 2, WWAN communications module 240 comprises a transceiver 242 and a reader 246. Transceiver 242 is configured to transmit and/or receive wireless communications for WWAN communications module 240. In some embodiments, reader 246 is configured to read and/or access content 22 stored on SIM card 20.

In FIG. 2, reader module 250 is a component configured to process and/or read data (e.g., content 22) stored on SIM card 20. Reader module 250 is configured to enable a variety of components in electronic device 10 other than WWAN communications module 240 to access the information stored as content 22 on SIM card 20. Non-WWAN communications module 260 is a communications system which enables electronic device 10 to communicate with other users and/or electronic devices using a communications protocol other than a WWAN communications protocol (e.g., WiFi, Bluetooth, etc.). For example, in FIG. 2, non-WWAN communications module 260 may use content 22 stored on SIM card 20 to provide a non-WWAN communications provider authentication information 24 for a user of electronic device 10. In FIG. 2, non-WWAN communications module 260 comprises a transceiver 262 which is configured to transmit and/or receive wireless communications using non-WWAN communications module 260. Operating system 270 is an operating resource within electronic device 10 configured to enable other components and/or applications (e.g., an address book application, an optical drive, etc.) within electronic device to access content 22 via reader module 250.

In operation, controller 240 executes SIM card usage manager 234 to identify a communications module configuration for electronic device 10. In some embodiments, controller 240 executes SIM card usage manager 234 when electronic device 10 initializes. In some embodiments, controller 240 executes SIM card usage manager 234 in response to a user request to change communication modules and/or other request by electronic device 10. In identifying the communications module configuration, SIM card usage manager 234 initially determines whether electronic device 10 is operating using WWAN communications module 240, non-WWAN communications module 260, both WWAN communications module 240 and non-WWAN communications module 260, or neither WWAN communications module 240 nor non-WWAN communications module 260. In some embodiments, SIM card usage manager 234 makes the determination by identifying whether an electronic signal is detected from the area in which WWAN communications module 240 and/or non-WWAN communications module 260 are coupled and/or disposed. In some embodiments, SIM card usage manager 234 makes the determination by identifying whether a user and/or an administrator stored a default setting indicating with which communications module to operate.

If SIM card usage manager 234 determines that electronic device 10 is operating using WWAN communications module 240, then SIM card usage manager 234 transmits a message to GPIO 232 to actuate switch 210 to activate and/or enable WWAN communications module 240, thereby enabling reader 246 to read and/or access content 22 stored in SIM card 20. If, on the other hand, controller 240 determines that either electronic device 10 is operating using non-WWAN communications module 260 or that another component (e.g., operating system 270) within electronic device 10 is requesting access to content 22, then controller 240 actuates switch 210 to activate and/or enable reader module 250 to read and/or access content 22 stored on SIM card 20.

If, however, controller 240 determines that electronic device 10 is operating using both WWAN communications module 240 and non-WWAN communications module 260, SIM card usage manager 234 actuates switch 210 to activate and/or enable only WWAN communications module 240 to read and/or access content 22 stored on SIM card 20. In this embodiment, non-WWAN communications module 260 and operating system 270 are coupled to WWAN communications module 240, and reader 246 is configured to access and/or read content 22 on SIM card 20 and provide content 22 for use by non-WWAN communications module 250 and/or operating system 270. If controller 240 determines that neither WWAN communications module 240 nor non-WWAN communications module 260 is operating (or are absent from electronic device 10), controller 240 actuates switch 210 to enable reader 246 to access and/or read content 22 on SIM card 20 and provide content 22 for use by operating system 270. However, it should be understood that system 200 may be otherwise configured to enable access to content 22 stored on SIM card 20 when both WWAN communications module 240 and non-WWAN communications module 260 are operating or both are not operating (or are absent from electronic device 10). Further, by enabling operating system 270 request and/or otherwise access content 22 stored on SIM card 20, content 22 can be easily and securely transferred between various components/application within electronic device, and/or between one electronic device 10 and another compatible electronic device 10 (e.g., by physically transferring SIM card 20 between one electronic device 10 (a notebook computer) and another compatible electronic device 10 (a telephone), the content contained on SIM card 20 may also be transferred and/or accessed by both devices).

Figure 3:
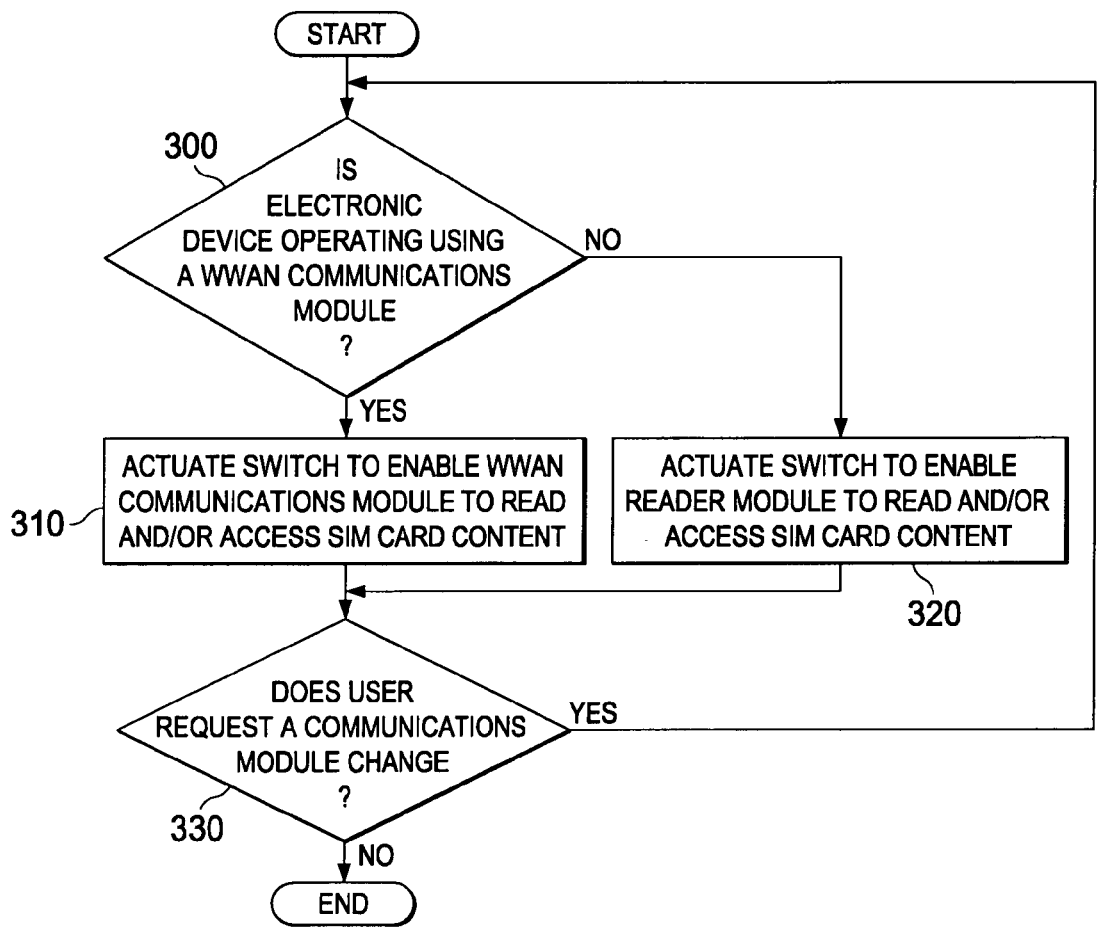
FIG. 3 is a flow chart illustrating an embodiment of a SIM content processing method.

FIG. 3 is a flow chart illustrating an embodiment of a SIM card 20 content 22 processing method. The process begins at block 300 with controller 240 executing and/or initiating SIM card usage manager 234 to determine whether electronic device 10 is operating using WWAN communications module 240. In some embodiments, SIM card usage manager 234 initiates and/or executes during initialization processes of electronic device 10. In some embodiments, SIM card usage manager 234 initiates and/or executes by request of a user via a graphical user interface and/or other input device.

If electronic device 10 is operating using WWAN communications module 240 ("yes" output to block 300), then SIM card usage manager 234 transmits a command to GPIO 232 to actuate switch 210 to enable WWAN communications module 240 via reader 246 to read and/or access content 22 stored on SIM card 20 (block 310). SIM card usage manager 234 then determines and/or identifies when a user requests a change in communications modules (e.g., change from WWAN communications module 240 to non-WWAN communications module 260) (block 330). If the user requests to change communications modules ("yes" output to block 330), the method returns to block 300 and is repeated. If, however, the user does not request a change to communications modules ("no" output to block 330), the method terminates thereafter. If electronic device 10 is not operating using WWAN communications module 240 (e.g., operating using non-WWAN communications module 260, WWAN communications module 240 is absent, etc.) ("No" output to block 300), SIM card usage manager 234 transmits a command to GPIO 234 to actuate switch 210 to enable reader module 250 to read and/or access content 22 stored on SIM card 20 (block 320), with the method proceeding to decision block 330 thereafter.

The illustrative embodiments may be implemented in software and can be adapted to run on different platforms and operating systems. In particular, functions implemented by system 200, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

Thus, embodiments of system 200 enable electronic device 10 to use and/or access content 22 stored on SIM card 20 using either a WWAN communications module 240 or a non-WWAN communications module 260. System 200 is also configured to enable a user to transfer and/or share content 22 stored on SIM card 20 between different electronic devices 10 (e.g., between a cellular phone and a notebook computer). Furthermore, system 200 provides an external SIM card slot 66 to facilitate the easy removal and/or insertion of SIM card 20 into electronic device 10.

What is claimed is:

1. An electronic device, comprising: a controller coupled to a switch and configured to control actuation of the switch to enable at least two different modules of the electronic device to access content stored on a subscriber identity module (SIM) card coupled to the electronic device based on a communications module operating configuration for the electronic device, wherein in response to the communications module operating configuration being both a non-Wireless Wide Area Network (WWAN) communications module and a Wireless Wide Area Network (WWAN) communications module, the controller to actuate the switch to enable the WWAN communications module to access content stored on the SIM card.

2. The electronic device of claim 1, wherein the controller comprises a usage manager configured to determine the communications module operating configuration of the electronic device.

3. The electronic device of claim 1, wherein the controller actuates the switch to enable a reader module to access the content in response to the communications module operating configuration being the non-WWAN module.

4. The electronic device of claim 1, wherein the controller actuates the switch to enable a reader module to access the content in response to an operating system of the electronic device requesting access to the content.

5. The electronic device of claim 1, wherein the controller actuates the switch to enable the WWAN communications module to access the content in response to the communications module operating configuration being the WWAN communications module.

6. An electronic device, comprising: a controller coupled to a switch and configured to control actuation of the switch to enable at least two different modules of the electronic device to access content stored on a subscriber identity module (SIM) card coupled to the electronic device based on a communications module operating configuration for the electronic device, wherein the controller actuates the switch to enable a reader module to access the content in response to detecting a communications module operating configuration including an absence of operation of both a non-Wireless Wide Area Network (WWAN) communications module and a Wireless Wide Area Network (WWAN) communications module.

7. The electronic device of claim 1, wherein the controller is a general purpose input/output device.

8. A method for accessing content stored on a subscriber identity module (SIM) card, comprising: determining a communications module operating configuration for an electronic device having a controller, a SIM card manager, and a SIM card coupled thereto, the determination to be made by the SIM card manager; and responsive to determining that the communications module operating configuration is both a non-Wireless Wide Area Network (WWAN) communications module and a Wireless Wide Area Network (WWAN) communications module, actuating a switch to enable the WWAN communications module of the electronic device to access content stored on the SIM card, the actuation to be driven by the controller.

9. The method of claim 8, further comprising accessing the content stored on the SIM card using a reader module in response to the communications module operating configuration being a non-Wireless Wide Area Network communications (WWAN) module.

10. The method of claim 8, further comprising accessing the content stored on the SIM card using a reader module in response to an operating system of the electronic device requesting access to the content.

11. The method of claim 8, further comprising accessing the content stored on the SIM card using a WWAN communications module in response to the communications module operating configuration being the WWAN communications module.

12. A method for accessing content stored on a subscriber identity module (SIM) card, comprising: determining a communications module operating configuration for an electronic device having a controller, a SIM card manager, and a SIM card coupled thereto, the determination to be made by the SIM card manager; and accessing the content stored on the subscriber identity module using a reader module in response to detecting non-operation of both a non-Wireless Wide Area Network (WWAN) communications module and a Wireless Wide Area Network (WWAN) communications module of the electronic device.

13. A non-transitory computer-readable medium having stored thereon an instruction set to be executed, the instruction set, when executed by a processor, causes the processor to: determine a communications module operating configuration for an electronic device having a subscriber identity module (SIM) card coupled thereto; and responsive to the determined communications module operating configuration, actuating a switch to enable at least two different modules of the electronic device to access content stored on the SIM card, wherein in response to determining that the communications module operating configuration is both a non-Wireless Wide Area Network (WWAN) communications module and a Wireless Wide Area Network (WWAN) communications module, actuating the switch to enable the processor to access content stored on the SIM card using the WWAN communications module.

14. The computer-readable medium of claim 13, wherein the instruction set, when executed by the processor, causes the processor to access the content stored on the SIM card using a reader module in response to the communications module operating configuration being a non-Wide Area Wireless Network communications (WWAN) module.

15. The computer-readable medium of claim 13, wherein the instruction set, when executed by the processor, causes the processor to access the content stored on the SIM card using a reader module in response to an operating system of the electronic device requesting access to the content.

16. The computer-readable medium of claim 13, wherein the instruction set, when executed by the processor, causes the processor to access the content stored on the SIM card using a WWAN communications module in response to the communications module operating configuration being the WWAN communications module.

17. An electronic device, comprising:
- a slot configured to accept a subscriber identification module (SIM) card;
- a non-Wireless Wide Area Network (WWAN) communications module coupled to a reader module, the non-WWAN communications module to utilize the reader module to read content recorded on the SIM card;
- a Wireless Wide Area Network (WWAN) communications module including a WWAN reader, the WWAN communication module configured to utilize the WWAN reader, and not the reader module, to read content recorded on the SIM card; and
- a switch to enable the WWAN communications module to access content recorded on the SIM card in response to detecting that both the non-WWAN communications module and the WWAN communications module are operating.

18. The electronic device of claim 17 wherein in response to detecting that the WWAN communications module is not operating, the switch to enable said non-WWAN communications module to utilize the reader module to access content on the SIM card for non-WWAN authentication of said electronic device.

19. An electronic device, comprising:
- a slot configured to accept a subscriber identification module (SIM) card;
- a non-Wireless Wide Area Network (WWAN) communications module coupled to a reader module, the non-WWAN communications module to utilize the reader module to read content recorded on the SIM card;
- a Wireless Wide Area Network (WWAN) communications module including a WWAN reader, the WWAN communication module configured to utilize the WWAN reader, and not the reader module, to read content recorded on the SIM card; and
- a switch to enable the reader module to access content recorded on the SIM card in response to detecting that neither the non-WWAN communications module nor the WWAN communications module are operating.

20. The electronic device of claim 19 further comprising an operating system, the operating system to access content from said SIM card via the reader module.

* * * * *